United States Patent
Hahn, III et al.

(10) Patent No.: US 12,446,839 B2
(45) Date of Patent: Oct. 21, 2025

(54) SYSTEMS AND METHODS FOR PROCESSING ELECTRONIC IMAGES USING USER INPUTS

(71) Applicant: HeartFlow, Inc., Redwood City, CA (US)

(72) Inventors: Edward Karl Hahn, III, Foster City, CA (US); Michiel Schaap, Oegstgeest (NL); Daniel Rueckert, Munich (DE)

(73) Assignee: Heartflow, Inc., Mountain View, CA (US)

( * ) Notice: Subject to any disclaimer, the term of this patent is extended or adjusted under 35 U.S.C. 154(b) by 403 days.

(21) Appl. No.: 18/059,079

(22) Filed: Nov. 28, 2022

(65) Prior Publication Data

US 2023/0165544 A1 Jun. 1, 2023

Related U.S. Application Data

(60) Provisional application No. 63/283,625, filed on Nov. 29, 2021.

(51) Int. Cl.
*G16H 30/40* (2018.01)
*A61B 6/03* (2006.01)
*G06T 7/00* (2017.01)

(52) U.S. Cl.
CPC ............ *A61B 6/032* (2013.01); *G06T 7/0012* (2013.01)

(58) Field of Classification Search
CPC ....... A61B 6/032; G06T 7/0012; G16H 30/40
USPC ........................................................ 382/128
See application file for complete search history.

(56) References Cited

U.S. PATENT DOCUMENTS

| | | |
|---|---|---|
| 8,315,812 B2 | 11/2012 | Taylor |
| 8,917,925 B1 | 12/2014 | Grady et al. |
| 9,304,982 B2 | 4/2016 | Grady et al. |
| 9,773,219 B2 | 9/2017 | Sankaran et al. |
| 10,354,349 B2 | 7/2019 | Sankaran et al. |
| 10,600,181 B2 | 3/2020 | Petersen et al. |
| 10,789,706 B2 | 9/2020 | Grady et al. |
| 2014/0275947 A1 | 9/2014 | Fonte et al. |
| 2018/0182096 A1 | 6/2018 | Grady et al. |
| 2018/0225847 A1 | 8/2018 | Grady et al. |
| 2020/0286266 A1* | 9/2020 | Song ..................... G01T 1/2985 |
| 2021/0110302 A1* | 4/2021 | Nam ...................... G06N 20/00 |
| 2021/0216822 A1 | 7/2021 | Paik et al. |

FOREIGN PATENT DOCUMENTS

CA 2702782 A1 * 5/2010 ............. A61B 6/025

OTHER PUBLICATIONS

Sermesant, Maxime, et al. "Applications of artificial intelligence in cardiovascular imaging." Nature Reviews Cardiology 18.8 (2021): 600-609.

* cited by examiner

*Primary Examiner* — Charlotte M Baker
(74) *Attorney, Agent, or Firm* — Bookoff McAndrews, PLLC

(57) ABSTRACT

A computer-implemented method for medical measurement reconstruction may comprise obtaining a first reconstruction of at least one representation of at least one set of medical measurements; presenting the first reconstruction or information about the first reconstruction to a reviewer; receiving an input from the reviewer relating to the first reconstruction or the information about the first reconstruction; processing the received input; and generating a second, modified reconstruction based on the received input.

22 Claims, 6 Drawing Sheets

SYSTEMS AND METHODS FOR PROCESSING ELECTRONIC IMAGES USING USER INPUTS

CROSS-REFERENCE TO RELATED APPLICATION[S]

This application claims priority to U.S. Provisional Application No. 63/283,625, filed Nov. 29, 2021, which is incorporated herein by reference in its entirety.

TECHNICAL FIELD

Embodiments include methods and systems for incorporating user inputs in a medical imaging pipeline and, more particularly, methods and systems for incorporating user feedback into medical image reconstruction.

BACKGROUND

Medical imaging pipelines may comprise acquisition and reconstruction steps that are performed without precise knowledge of how the measurements and reconstructions will be used by downstream applications. Furthermore, image acquisition and reconstruction may not account for aspects of an imaged subject's anatomy or physiology. Imaging measurements are frequently not acquired under ideal conditions and may include noise. Deviation from ideal imaging conditions degrades utility (e.g., quality, usability, processability) of the acquired measurements for downstream tasks or workflows dependent upon those measurements. Therefore, a need exists for methods and systems for incorporating user inputs in a medical imaging pipeline.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for incorporating user inputs in a medical imaging pipeline.

In an example, a computer-implemented method for medical measurement reconstruction may comprise obtaining a first reconstruction of at least one representation of at least one set of medical measurements; presenting the first reconstruction or information about the first reconstruction to a reviewer; receiving an input from the reviewer relating to the first reconstruction or the information about the first reconstruction; processing the received input; and generating a second, modified reconstruction based on the received input.

Any of the methods, systems, or devices disclosed herein may include any of the following features. The at least one set of medical measurements may include medical imaging measurements. The received input may relate to a characteristic of a patient. The characteristic may include an aspect of an anatomy or a physiology of a patient. The method may further comprise determining whether a stopping criterion is satisfied and, upon determining that the stopping criterion is not satisfied, iterating one or more of the obtaining, presenting, receiving, processing, or generating steps. The method may further comprise determining from which step to iterate. The determining whether the stopping criterion is satisfied may include assessing a change in a quality index. The method may further comprise receiving information about the reviewer or a type of input to be received. Processing the received input may include altering a reconstruction algorithm. The method may further comprise receiving at least one set of patient-specific measurements.

In another example, a system for processing electronic images for medical measurement reconstruction, comprising: a data storage device storing instructions for medical measurement reconstruction; and a processor configured to execute the instructions to perform operations comprising: obtaining a first reconstruction of at least one representation of at least one set of medical measurements; presenting the first reconstruction or information about the first reconstruction to a reviewer; receiving an input from the reviewer relating to the first reconstruction or the information about the first reconstruction; processing the received input; and generating a second, modified reconstruction based on the received input.

In a further example, a non-transitory computer-readable medium may store instructions that, when executed by one or more processors, cause the one or more processors to perform computer-implemented method for medical measurement reconstruction, the method comprising: obtaining a first reconstruction of at least one representation of at least one set of medical measurements; presenting the first reconstruction or information about the first reconstruction to a reviewer; receiving an input from the reviewer relating to the first reconstruction or the information about the first reconstruction; processing the received input; and generating a second, modified reconstruction based on the received input.

Additional objects and advantages of the techniques presented herein will be set forth in part in the description that follows, and in part will be apparent from the description, or may be learned by practice of the techniques presented herein. The objects and advantages of the techniques presented herein will be realized and attained by means of the elements and combinations particularly pointed out in the appended claims.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute part of this specification, illustrate various exemplary embodiments and together with the description, serve to explain the principles of the disclosed embodiments.

DETAILED DESCRIPTION

Figure 1:
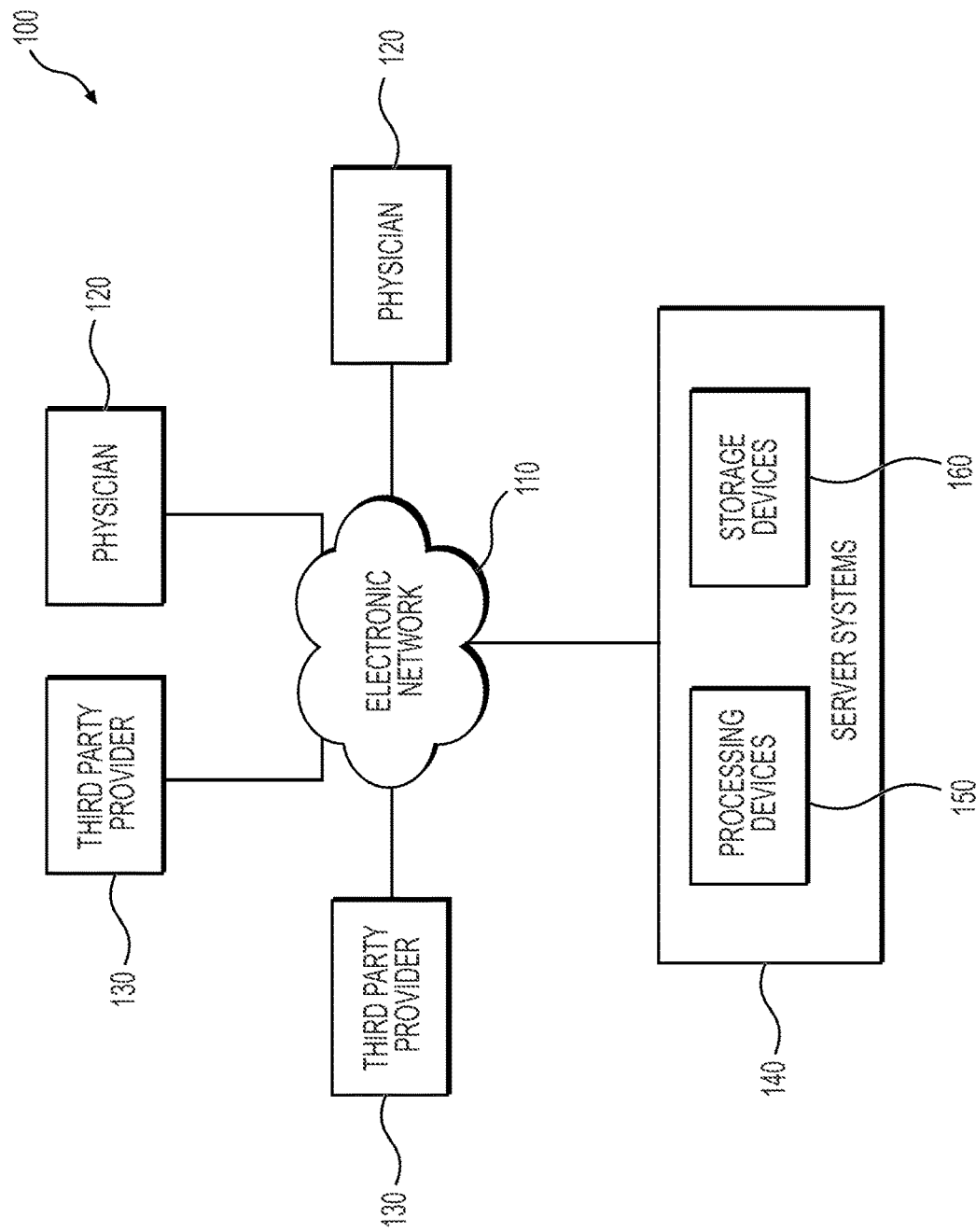
FIG. 1 depicts an example computer environment for performing the techniques described herein.

Medical imaging (or other medical measurement gathering) may involve acquiring data using medical imaging equipment. For example, modalities of collecting patient measurements may include computed tomography ("CT") (such as, for example, coronary computed tomography angiography ("CCTA")), magnetic resonance imaging ("MRI"), positron emission tomography ("PET"), ultrasound, electrocardiography, and/or X-ray. Data may be acquired using various acquisition protocols, to be selected by a user. Acquired data may be reconstructed in order to transform the data into an image that is interpretable by a human. Such images may be analyzed and/or interpreted by a user or an automated computer system. A medical imaging pipeline may include any of the steps above (acquisition, reconstruction, analysis, and/or interpretation), as well as any other steps.

However, real-world measurements might not be acquired under ideal conditions. For example, measurements acquired may include noise (e.g., due to physical phenomena associated with the imaging modality or hardware) or unforeseen variability in patient anatomy or physiology. Deviation from ideal imaging conditions may degrade utility (e.g., quality, usability, ability to be processed, etc.) of the acquired measurements for downstream tasks or workflows, including tasks or workflows that rely on reconstructions of those measurements. Flaws in acquired measurements may be propagated to downstream tasks/outputs (e.g., reconstructions, analyses, and/or interpretations).

Current reconstruction, analysis (e.g., modeling), or interpretation methods may thus present incomplete or inaccurate information to a user. Such incomplete or inaccurate information may decrease a utility of the reconstruction, analysis, or interpretation methods and/or lead to compromises in patient evaluation or care. The disclosed methods and systems improve existing technology by incorporating feedback from users in order to prevent or inhibit artifacts from a reconstruction from being propagated downstream.

Users associated with the downstream tasks may possess prior knowledge useful to mitigate against propagation of flaws/unacceptable levels of quality. Embodiments described herein may include one or more interactions between user(s) and the medical imaging (e.g., acquisition and reconstruction) pipeline. A user may provide input in order to improve one or more image quality indexes. In some examples, such input may be provided iteratively. The user's input may be based on prior knowledge (e.g., of a patient's anatomy or physiology) and/or procedural knowledge of a downstream task. The user's input may resolve ambiguities that may otherwise be intrinsic to the medical imaging pipelines.

Techniques described herein may provide a system and method to integrate feedback from users (e.g., users of downstream applications) into the acquisition or reconstruction pipelines to reduce uncertainty for that application. For example, certain embodiments may provide a method for interactive reconstruction, where the method may tightly couple an arbitrary acquisition or reconstruction pipeline with user workflow to improve utility of the pipeline output for arbitrary downstream tasks. Additionally, or alternatively, and as another example, certain embodiments may facilitate user interaction with medical imaging pipelines to mitigate acquisition or reconstruction uncertainty according to prior knowledge and objectives of downstream applications. Certain embodiments may be used in connection with certain embodiments disclosed in U.S. Publication No. 2018/0182096 and U.S. Pat. No. 10,354,349, which are incorporated herein by reference in their entireties.

FIG. 1 depicts an example environment in which such a computer system may be implemented as server systems 140. In addition to server systems 140, the environment of FIG. 1 further includes a plurality of physicians 120 and third party providers 130, any of which may be connected to an electronic network 110, such as the Internet, through one or more computers, servers, and/or handheld mobile devices. In FIG. 1, physicians 120 and third party providers 130 may each represent a computer system, as well as an organization that uses such a system. For example, a physician 120 may be a hospital or a computer system of a hospital.

Physicians 120 and/or third party providers 130 may create or otherwise obtain medical images, such as images of the cardiac, vascular, and/or organ systems, of one or more patients. Physicians 120 and/or third party providers 130 may also obtain any combination of patient-specific information, such as age, medical history, blood pressure, blood viscosity, and other types of patient-specific information. Physicians 120 and/or third party providers 130 may transmit the patient-specific information to server systems 140 over the electronic network 110.

Server systems 140 may include one or more storage devices 160 for storing images and data received from physicians 120 and/or third party providers 130. The storage devices 160 may be considered to be components of the memory of the server systems 140. Server systems 140 may also include one or more processing devices 150 for processing images and data stored in the storage devices and for performing any computer-implementable process described in this disclosure. Each of the processing devices 150 may be a processor or a device that include at least one processor.

In some embodiments, server systems 140 may have a cloud computing platform with scalable resources for computations and/or data storage, and may run an application for performing methods described in this disclosure on the cloud computing platform. In such embodiments, any outputs may be transmitted to another computer system, such as a personal computer, for display and/or storage.

Other examples of computer systems for performing methods of this disclosure include desktop computers, laptop computers, and mobile computing devices such as tablets and smartphones.

The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as server systems 140, further detailed by example device 600, may include one or more computing devices. If the one or more processors of the computer system is implemented as a plurality of processors, the plurality of processors may be included in a single computing device or distribute among a plurality of computing devices. If a computer system comprises a plurality of computing devices, the memory of the computer system may include the respective memory of each computing device of the plurality of computing devices.

Figure 2:
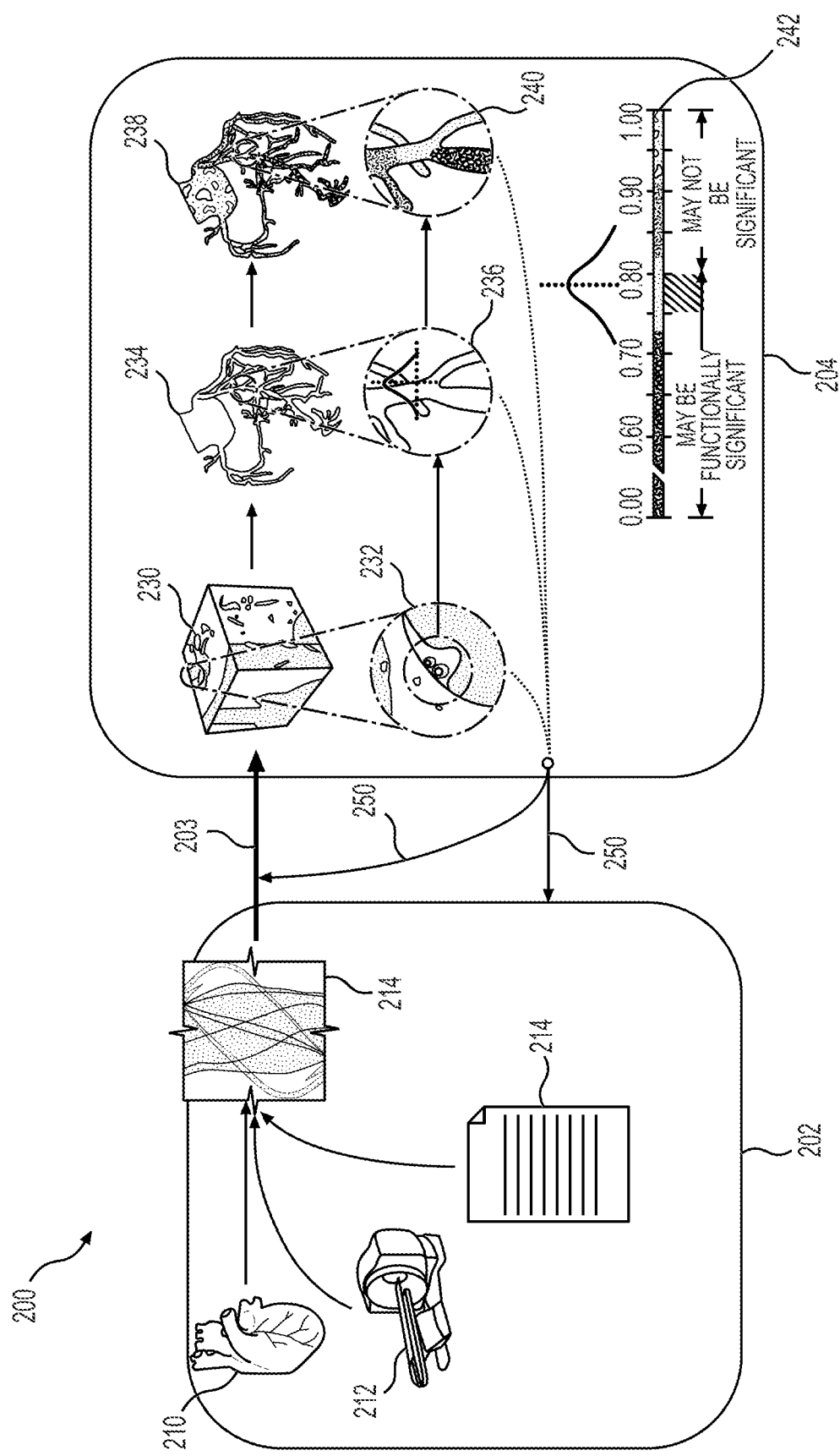
FIG. 2 illustrates an example medical imaging pipeline workflow.

FIG. 2 depicts an exemplary medical imaging workflow 200. Measurements/data may be acquired in acquisition phase 202, and images may be interpreted and analyzed, and user input may be provided, in image phase 204. The arrow 203 extending from acquisition phase 202 to image phase 204 may represent reconstruction of the measurements acquired in acquisition phase 202 into images utilized in image phase 204.

Various factors may contribute to the measurements acquired in acquisition phase 202. Exemplary factors include patient state 210, device properties 212, and preparation protocol 214. Patient state 210 may include various factors, including but not limited to patient position, variabilities in patient anatomy, patient bodily processes (e.g., heartbeats, bloodflow, inhalation/exhalation), patient demographic data, patient physiological characteristics, and/or patient movement. Device properties 212 may include any property of an acquisition device (e.g., scanner). Device properties 212 may include, for example, a modality, a manufacturer, a calibration, and/or measurement collection parameters (e.g., settings). Preparation protocol 214 may include, for example, any steps taken by a patient or medical provider in advance of or during acquisition of the measurements. The patient state 210, device properties 212, and/or preparation protocol 214 (along with other factors) may contribute to the measurements obtained and the projections 216 obtained. The projections may include two-dimensional, projected images/measurements obtained.

As represented by the arrow from acquisition phase 202 to image phase 204, during reconstruction 203, a reconstruction algorithm (or other methodology) may be applied in order to generate images with which a user may interact. Examples of reconstruction algorithms may include those described in one or more of the following U.S. Patents, which are incorporated herein by reference in their entirety: U.S. Pat. No. 8,917,925, entitled "Systems and Methods for Data and Model-Driven Image Reconstruction and Enhancement," issued Dec. 23, 2014, and/or U.S. Pat. No. 10,789,706, entitled "Systems and Methods for Medical Acquisition Processing and Machine Learning for Anatomical Assessment," issued Sep. 29, 2020.

Following reconstruction, image phase 204 may include viewing/manipulating one or more reconstructed image 230, segmenting the reconstructed image 230 to generate an anatomic model 234, and/or preparing an analysis 238 using anatomic model 234. Although singular nouns may be used to describe reconstructed image 230, model 234, and analysis 238, it will be appreciated that such terms, as well as for any other term herein unless otherwise specified, may be singular or plural. Analysis 238 may include, for example, determining/simulating/calculating a fractional flow reserve ($FFR_{CT}$). Analysis 238 may include any type of analysis/interpretation generated according to any suitable type of method. Segmenting the reconstructed image to generate an anatomic model 234 may include any of the techniques of the following U.S. Patents, which are incorporated by reference in their entireties: U.S. Pat. No. 8,315,812, entitled "Method and System for Patient-Specific Modeling of Blood Flow," issued Nov. 20, 2012; U.S. Pat. No. 9,773,219, entitled "Systems and Methods for Using Geometry Sensitivity Information for Guiding Workflow," issued Sep. 26, 2017; U.S. Pat. No. 10,600,181, entitled "Systems and Methods for Probabilistic Segmentation in Anatomical Image Processing," issued Mar. 24, 2020; and/or U.S. Pat. No. 9,304,982, entitled "Systems and Methods for Validating and Correcting Automated Medical Image Annotations," issued Apr. 5, 2016.

As shown in FIG. 2, reconstructed image 230 may include artifact(s) 232. Artifact(s) 232 may result from various sources, including from variabilities in any of patient state 210, device properties 212, and/or preparation protocol 214. Artifact 232 of reconstructed image 230 may be propagated to produce an induced uncertainty 236 (e.g., an induced geometric uncertainty) of anatomic model 234, which may in turn, produce analysis uncertainty 240 of analysis 238. In an example, analysis uncertainty 240 may include an induced $FFR_{CT}$ uncertainty where analysis 238 is an $FFR_{CT}$ analysis.

As shown by the arrow from image phase 204 to acquisition phase 202 and to the arrow representing reconstruction 203, feedback 250 may be utilized. As shown in FIG. 2, and discussed in further detail below, feedback 250 may be provided at any of the stages of image phase 204 (reconstructed image 230, anatomic model 234, and/or analysis 238). Feedback 250 may be utilized to make adjustments to any aspect of acquisition phase 202 or to a reconstruction process (e.g., a reconstruction algorithm).

Figure 3:
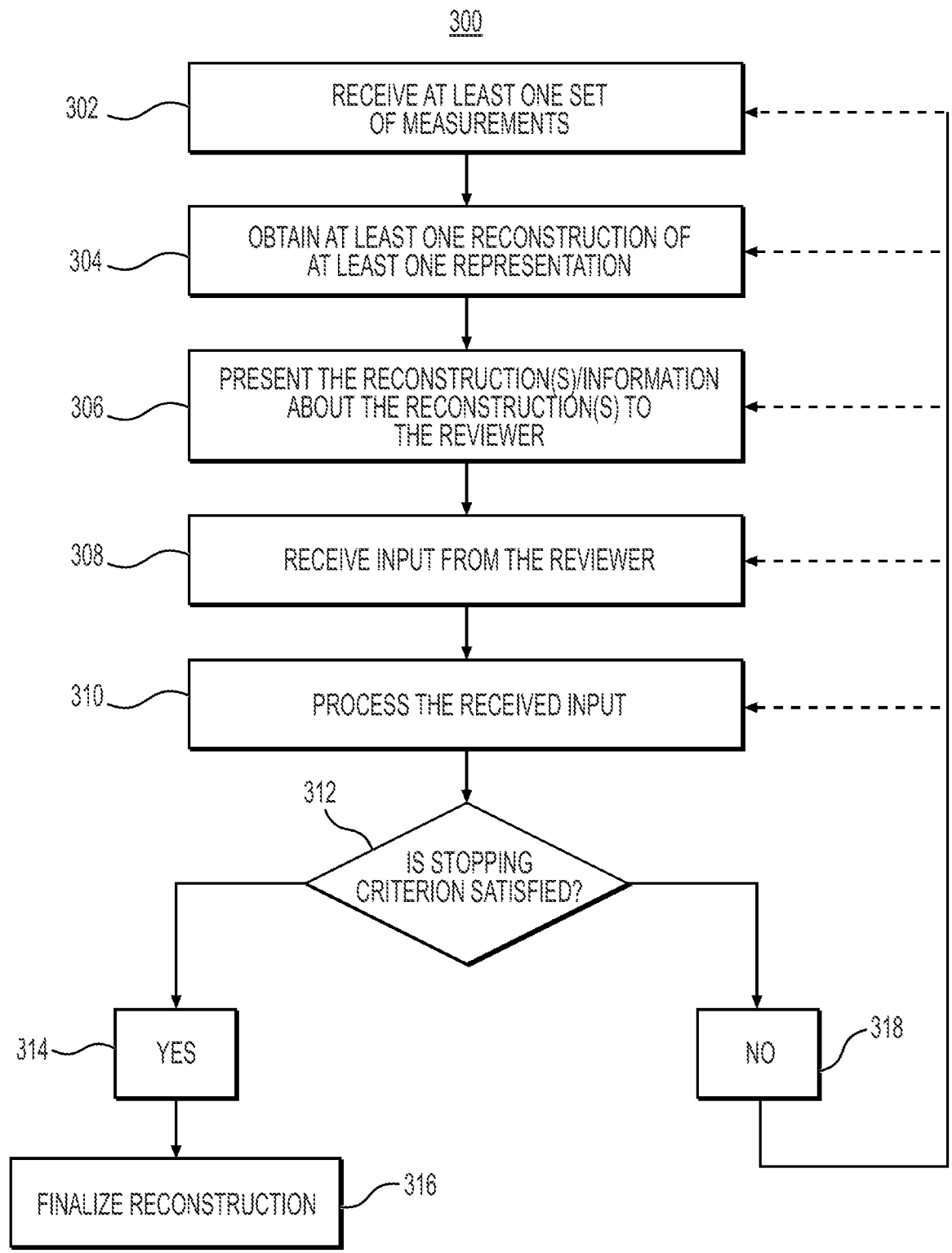
FIG. 3 depicts a flow chart of an exemplary method for incorporating user input into an image reconstruction.
Figure 4:
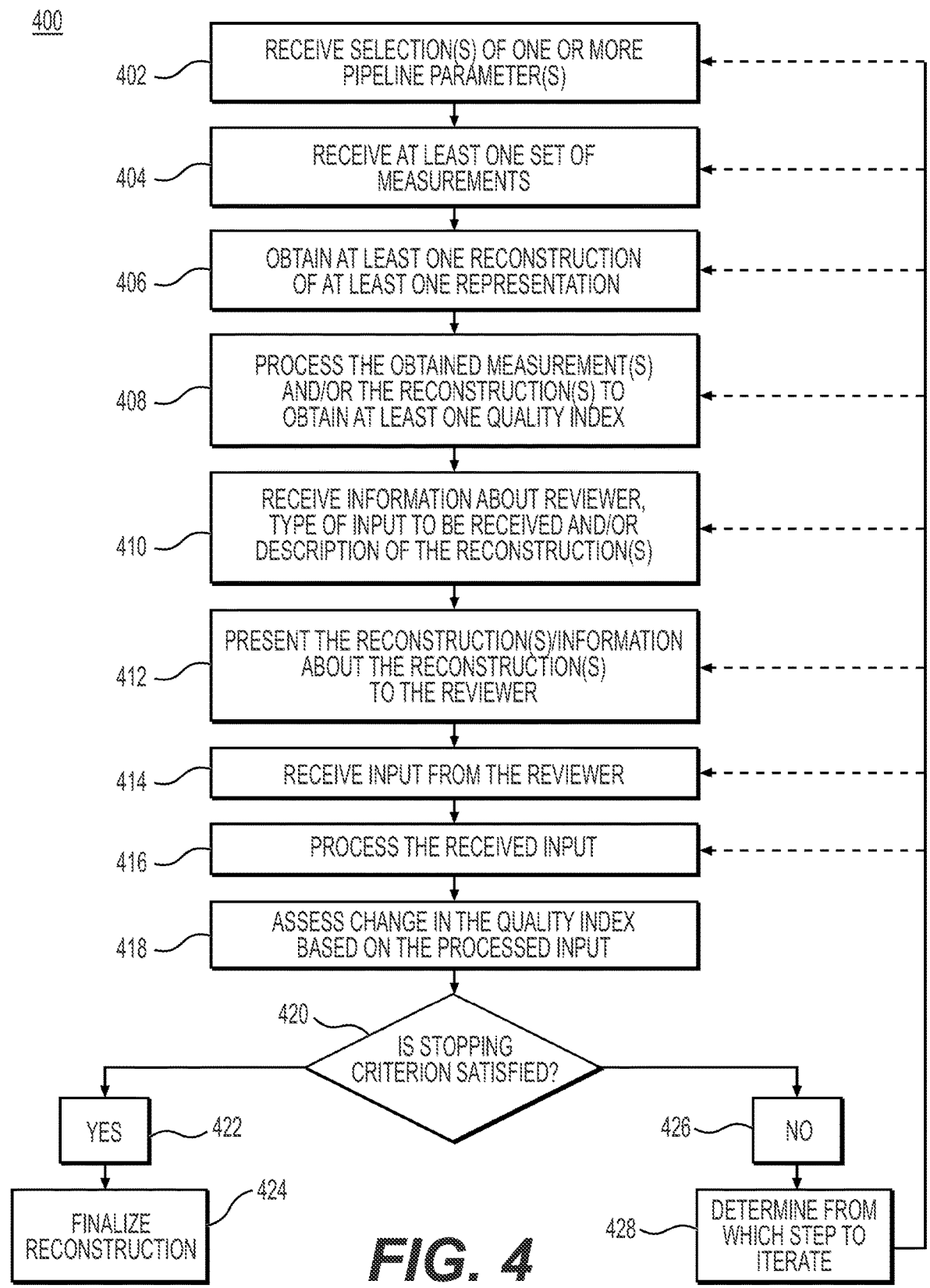
FIG. 4 depicts a flow chart of another exemplary method for incorporating user input into an image reconstruction.
Figure 5:
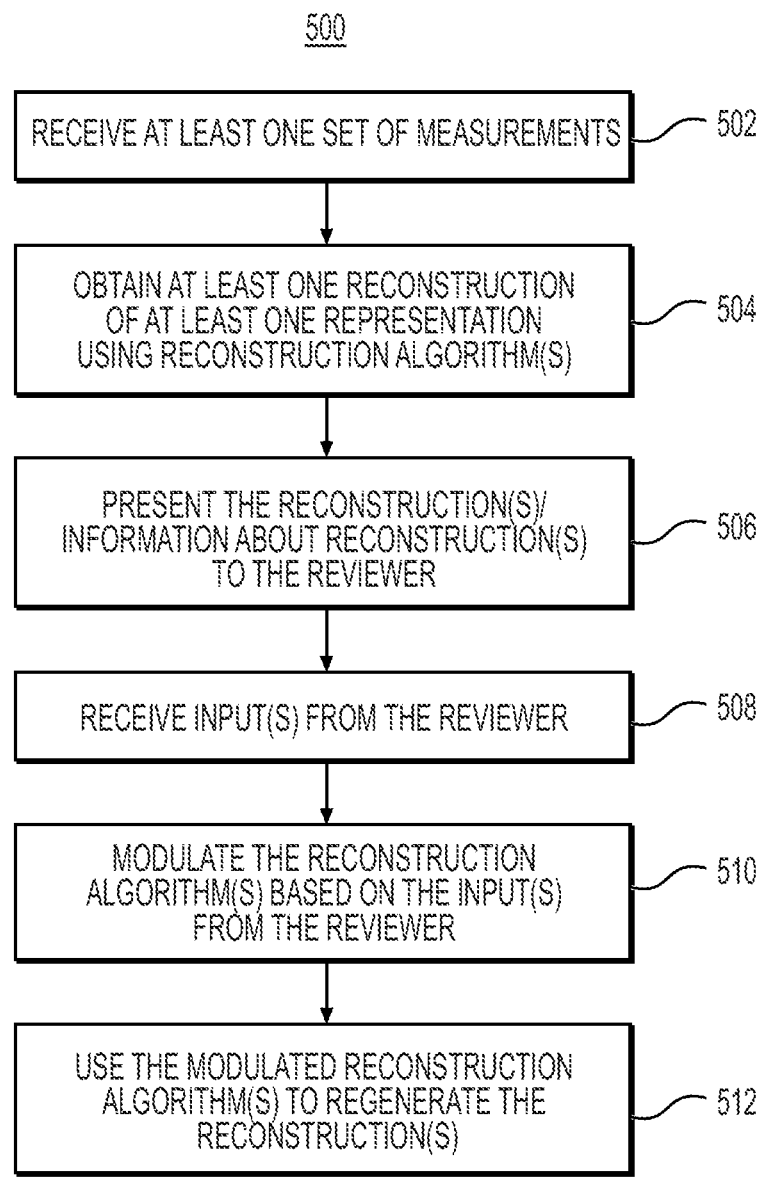
FIG. 5 depicts a flow chart of a further exemplary method for incorporating user input into an image reconstruction.

FIGS. 3-5 depict exemplary methods for generating, receiving, and/or utilizing user feedback. Although the methods are described separately for purpose of illustration, it will be appreciated that steps of the methods may be combined in any suitable manner. The methods may include additional or alternative steps, including those known in the art.

A computer-implemented method 300 of FIG. 3 may include, at step 302, receiving at least one set of patient-specific medical measurements (e.g., imaging measurements or other measurements). Step 302 may include measurements received using any of the elements of acquisition phase 202, described above. The measurements of step 302 may be acquired by any suitable imaging device, using any suitable protocol, including any of those described elsewhere herein. Step 302 may include acquiring measurements or may include receiving measurements that have been acquired by another party or at a previous time. In alternatives, step 302 may be omitted and method 300 may begin at step 302 or at a later step of method 300.

In step 302, at least one reconstruction of at least one representation may be obtained. Step 302 may include obtaining a reconstruction using any of the aspects of reconstruction 203, discussed above. Step 302 optionally may include generating the reconstruction or may include obtaining a reconstruction generated previously or by another party. The reconstruction obtained in step 302 may depict the measurements in a format interpretable by a user or by a computer for further analysis/processing. In some examples, the reconstruction may include a three-dimensional ("3D") image.

Step 306 may include presenting the reconstruction(s) obtained in step 302 and/or information about the reconstruction(s) to a reviewer. The reviewer may include a human user, such as a downstream user (e.g., a user who would utilize a model or an analysis generated using the reconstructions). In alternatives, a model, analysis, or interpretation (or information about the model, analysis, or interpretation) may be presented to the reviewer instead of or in addition to the reconstruction. Step 306 may utilize a user interface to present the reconstruction (or model/analysis/interpretation) to the reviewer. In some examples, the user interface may present particular prompts to a reviewer, asking for different pieces of information. In other examples, the user interface may present the item for feedback (e.g., reconstruction, model, analysis, interpretation, or information relating thereto) in a more open-ended manner.

Step 308 may include receiving input from the reviewer. The reviewer's input may include input relating to any relevant aspect, including those discussed in further detail below. The input may relate to any aspect of the measurements received in step 302 (including the underlying factors, such as patient anatomy), the reconstruction, the model, the analysis, the interpretation, or any other relevant detail.

Step 310 may include processing the received input. The input may be processed in any suitable manner. For example, the input may be processed to adjust a reconstruction, model, analysis, or interpretation. For example, the input may be processed in order to alter a reconstruction algorithm (or other method applied), which may be done automatically, and a revised reconstruction may be received. In other examples, the input may be processed by adjusting measurement acquisition parameters or protocols. New measurements may then be received and a new reconstruction (and/or model, analysis, or interpretation) may be generated. In other examples, processing the received input may include providing manual feedback to an image acquirer (e.g., an alert or a protocol suggestion or instruction).

Any of embodiments described herein may include or be used in connection with machine learning and/or deep learning. In examples, a machine learning system may be an active learning system. The machine learning system may be trained or updated using a stream of training data. In some examples, the training data may include data obtained from the received reviewer input. The trained machine learning model may be used to update measurement acquisition parameters (e.g., device settings, protocols, etc.) or to update or otherwise change a reconstruction process (e.g., a reconstruction algorithm). Machine learning models may be used in combination with reviewer-provided feedback.

In step 312, it may be determined whether a stopping criteria (or a plurality of stopping criteria) has been satisfied. For example, as discussed below, the determination may include comparing a quality measurement to a threshold. The satisfaction of the stopping criteria may be determined with reference to a reconstructed image, a model, an analysis, an interpretation, or a combination thereof.

If, in step 314, the stopping criteria has been satisfied, the reconstruction (or model, analysis, or interpretation) may be finalized in step 316. If, on the other hand, in step 318, the stopping criteria has not been satisfied, any one or more of steps 302, 304, 306, 308, 310 may be performed again. The arrows to steps 302, 304, 306, 308, 310 are in dotted lines to indicate that the repetition of those steps might not be required in every embodiment of method 300. Rather, which step(s) is/are repeated may depend on various factors including, for example, the feedback received, the extent to which there was deviation from the stopping criterion, the changes required to address the deviation from the stopping criterion, the intended, downstream use of the reconstruction, or any other factor.

FIG. 4 depicts an alternative computer-implemented method 400. In at least some regards, method 400 may provide further detail to method 300. Any aspect of method 300 may be incorporated into method 400, as appropriate.

Step 402 may include receiving selection(s) of one or more pipeline parameter(s). Pipeline parameters may include one or more of any of the following (at least some of which may be conditioned on other selection(s)). A downstream task to be performed may be selected. The downstream tasks may, in some examples, be diagnostic or prognostic. The tasks may be quantitative or qualitative. A measurement modality may be selected. Exemplary measurement modalities include any type of CT, MR, ultrasound, or electrocardiography. A target portion of a patient's anatomy also may be selected, along with an acquisition protocol. A reconstruction representation selection also may be received. The reconstruction representation may include any parametric or non-parametric model of a measured anatomy of a patient. A reconstruction algorithm for some or all of the selected representations. In some examples, a reconstruction algorithm may be optimization-based or machine learning-based. An example of such a reconstruction algorithm is found in U.S. application Ser. No. 15/852,183, filed on Dec. 22, 2017, and published as U.S. Patent Application Publication No. 2018/0182096, incorporated by reference in its entirety.

In step 404, at least one set of measurements may be received/obtained. Step 404 may incorporate any of the aspects of step 302 of method 300. In step 406, at least one reconstruction of at least one representation may be obtained. Step 406 may include any of the aspects of step 304 of method 300.

In step 408, the obtained/received measurement(s) and reconstruction(s) may be processed to obtain at least one quality index of the individual and/or aggregate measurement(s) and/or reconstruction(s). The quality index may include any measure by which utility for any downstream task may be assessed. For example, the quality index may include one or more of uncertainty, ability to be processed/analyzed/interpreted, suitability, usability, or any other suitable metric.

In step 410, information may be received regarding a reviewer, a type of input to be received, and/or a description of the reconstruction(s) obtained in step 406. The selections may be conditioned on previous selections, output(s), or processing thereof. A reviewer may be, in some examples, a user such as a downstream user. The reviewer may be chosen from a pool of qualified personnel (e.g., users). For example, the reviewer may be selected according to expected proficiency of the reviewer. Reviewer selection may be conditioned on, for example, one or more of quality index, modality, representation, reconstruction, etc. Multiple reviewers may be designated. The reviewers may provide the same type of input or may provide different types of input, depending on expertise. A type of input to be received may depend on the obtained quality index and/or qualities of reconstruction representation(s). A description of the reconstruction(s) may include features of the reconstruction(s) (e.g., patient information, modality, protocol information, reconstruction algorithm, etc.).

In step 412, the reconstruction(s) and/or information related thereto may be presented to the selected reviewer. For example, one or more description(s) of the reconstructed representation(s) to be presented to the user(s). In some examples, a description may be presented for each form of input sought from the reviewer. For example, a description may be presented for each image artifact, for different categories on which input is desired (e.g., anatomical features, downstream use, equipment details, etc. The information may be presented to the reviewer textually, visually, aurally, or by any other suitable means. The information presented may include any intermediate or auxiliary information associated with the representation. In some examples, some or all of the information presented may be obtained from the reconstruction algorithm.

In step 414, input may be received from at least one reviewer associated with at least one reconstructed representation. Step 414 may include any of the features of step 308, discussed above. The input from the reviewer(s) may be associated with one or more of different descriptions (such as those discussed above), different reconstructed representations, different modalities, or other variations. The input may relate to any measure (e.g., presence, absence, extent, magnitude, quantity, etc.) of one or more of anatomy, physiology, implant hardware, noise or artifact level, etc.

The user input received may be novel (e.g., particular to the reconstruction) or historical (e.g., based on previous reconstruction(s)).

In step 416, the received input may be processed. Step 416 may include any of the features of step 310, discussed above. For example, the received input may be processed to assess a change that the input has had. For example, a change may include a change in a quality index in step 418. Processing also may include reacquiring measurements or reconstructing measurements (either measurements previously obtained or measurements newly obtained) and/or estimating or simulating the result thereof to update the one or more quality indexes.

In step 420, it may be determined whether a stopping criterion is satisfied. In examples, a stopping criterion may be formulated in terms of relative or absolute improvement in at least one quality index. Alternatively, a stopping criterion may be based on a number of times a step has been performed, an amount of reviewers that have provided input, or other factors. If, in step 422, the stopping criterion is satisfied, then the reconstruction may be finalized.

If, on the other hand, the stopping criterion is not satisfied in step 426, then it may be determined from which step to iterate in step 428. Such a determination may be based on, for example, the processing of the input in step 416. The determination may be manual or automatic. The dotted arrows in FIG. 4 depict various options from where to iterate. One or more options may be selected in step 428. Iteration may continue (e.g., user input may continue to be received) until such input is exhausted or a stopping criterion for user input is satisfied. Subsequent user input selection(s) (either related to a current reconstruction or a future reconstruction) may be modified or novel forms of one or more of previously considered downstream tasks.

FIG. 5 depicts a further exemplary method 500 that may include modification or replacement of a reconstruction algorithm. Method 500 may include any of the steps of methods 300, 400, described above. Step 502 may include receiving at least one set of measurements and may have any of the aspects of steps 302, 404. Step 504 may include obtaining at least one reconstruction of at least one representation, using one or more reconstruction algorithm(s). Step 504 may include any aspect of steps 304, 406. Step 506 may include presenting the reconstruction(s) or information pertaining thereto to the reviewer. Step 506 may include any aspects of steps 306, 412. Step 508 may include receiving input(s) from the reviewer. Step 508 may include any of the aspects of steps 308, 414.

In step 510, the reconstruction algorithm(s) may be modulated, altered, or replaced based on the inputs received in step 508. Step 510 may be a particular example of step 310 or 416. In examples, step 510 may include selecting a new/alternate reconstruction algorithm from an existing library of reconstruction algorithms. Additionally or alternatively, step 510 may include making changes (e.g., custom and/or novel changes) to the reconstruction algorithm. For example, a reconstruction may be constrained by a prior image (and, optionally, feedback thereon). The reconstruction may also be based on known components. In step 512, the modulated, altered, or replacement reconstruction algorithm(s) may be used to regenerate the reconstruction(s). Step 512 may be a further exemplary embodiment of steps 310 or 416. Any or all steps of method 500 may be iterated as methods 300, 400, in any of the means described with respect to those methods or in alternative means.

In certain embodiments, the method(s) 300, 400, and/or 500 of FIGS. 3-5 may guide a reviewer (e.g., a user) in generation, review, or correction of image annotations (e.g., in steps 306, 308, 412, 414, 506, or 508) according to measures of image quality. Such annotations may be applied to a reconstruction and may be utilized in performing segmentation to generate a model. Such reviewer input may include prior knowledge of the reviewer that may be provided as a constraint or penalty to selected reconstruction algorithms. For example, the reviewer input may be used to change/adjust a reconstruction algorithm. The image data may then be regenerated by executing the reconstruction algorithm. As discussed above, the workflow may then be continued or terminated according to selected measures of quality recomputed from the newly reconstructed images and current user progress.

In such examples, the user input received (e.g., in step 308, 414, or 508) may include various anatomical descriptors, such as one or more of: existence or absence of various structures or features, anatomy definition, (e.g., of key point(s)), centerline(s), segmentation(s), semantic labeling, boundaries of a surface, curve, or other structure, or tissue.

In another example, cardiac motion during CT acquisition may result in associated artifacts due to inadequate or lack of motion compensation by an image reconstruction algorithm. Using the methods described herein, a reviewer may interact with the reconstruction pipeline to obtain an initial or improved estimate of cardiac motion. This motion estimate may be used via motion-compensated reconstruction to produce an improved image with reduced artifact severity. The reviewer input may include denotation of corresponding points between images reconstructed at different time points. The reviewer input may additionally or alternatively include manipulation of a motion field to determine its impact on motion artifact appearance.

Figure 6:
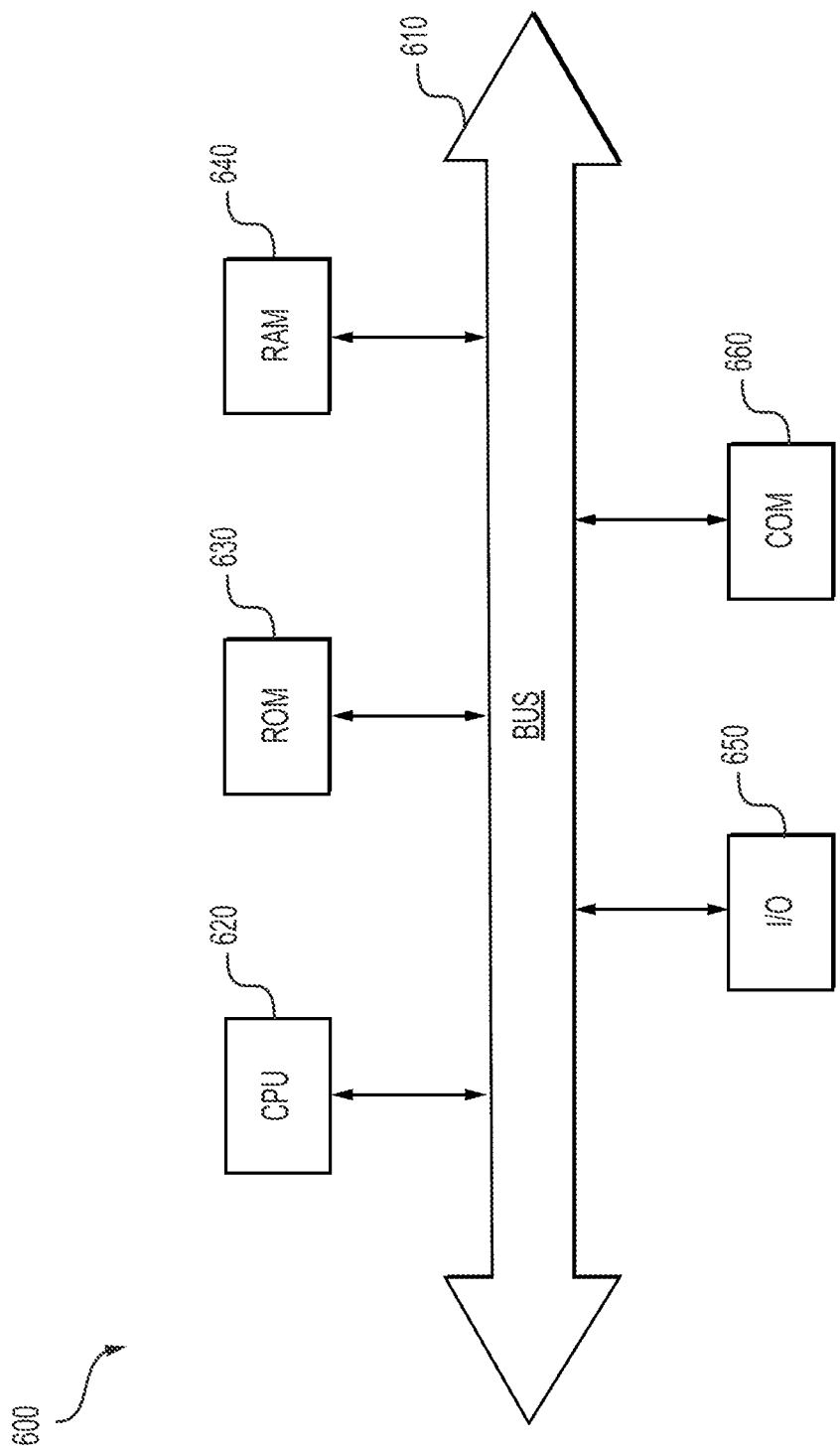
FIG. 6 depicts an exemplary system that may execute techniques presented herein.

As shown in FIG. 6, device 600 may include a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multi-processor system, such system operating alone, or in a cluster of computing devices operating in a cluster or server farm. CPU 620 may be connected to a data communication infrastructure 610, for example a bus, message queue, network, or multi-core message-passing scheme.

Device 600 may also include a main memory 640, for example, random access memory (RAM), and also may include a secondary memory 630. Secondary memory 630, e.g. a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include similar means for allowing computer programs or other instructions to be loaded into device 600. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 600.

Device 600 also may include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 600 may also include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

One or more techniques presented herein may enable a user, to better interact with a digital image of a glass slide that may be presented on a screen, in a virtual reality environment, in an augmented reality environment, or via some other form of visual display. One or more techniques presented herein may enable a natural interaction closer to traditional microscopy with less fatigue than using a mouse, keyboard, and/or other similar standard computer input devices.

The controllers disclosed herein may be comfortable for a user to control. The controllers disclosed herein may be implemented anywhere that digital healthcare is practiced, namely in hospitals, clinics, labs, and satellite or home offices. Standard technology may facilitate connections between input devices and computers (USB ports, Bluetooth (wireless), etc.) and may include customer drivers and software for programming, calibrating, and allowing inputs from the device to be received properly by a computer and visualization software.

The foregoing general description is exemplary and explanatory only, and not restrictive of the disclosure. Other embodiments of the invention may be apparent to those skilled in the art from consideration of the specification and practice of the invention disclosed herein. It is intended that the specification and examples be considered as exemplary only.

What is claimed is:

1. A computer-implemented method for medical measurement reconstruction, the method comprising:
   receiving an indication of a downstream task from a reviewer;
   obtaining a first reconstruction of at least one representation of at least one set of medical measurements;
   determining, based upon the first reconstruction and the downstream task, a first quality score;
   presenting the first quality score and the downstream task to the reviewer;
   receiving a correction request from the reviewer;
   processing the correction request;
   generating a modified reconstruction based on the correction request;
   determining, based on the modified reconstruction and the downstream task, a second quality score; and
   iterating one or more steps of the method until the second quality score exceeds a predetermined threshold.

2. The computer-implemented method of claim 1, wherein the at least one set of medical measurements includes medical imaging measurements.

3. The computer-implemented method of claim 1, wherein the correction request relates to a characteristic of a patient.

4. The computer-implemented method of claim 3, wherein the characteristic includes an aspect of an anatomy or a physiology of a patient.

5. The computer-implemented method of claim 1, wherein processing the correction request includes reacquiring the at least one set of medical measurements to update the first quality score.

6. The computer-implemented method of claim 1, further comprising determining from which step to iterate.

7. The computer-implemented method of claim 1, wherein processing the correction request includes estimating the at least one set of medical measurements to update the first quality score.

8. The computer-implemented method of claim 1, further comprising receiving information about the reviewer or a type of input to be received.

9. The computer-implemented method of claim 1, wherein processing the correction request includes altering a reconstruction algorithm.

10. The computer-implemented method of claim 1, further comprising receiving at least one set of patient-specific measurements.

11. A system for processing electronic images for medical measurement reconstruction, comprising:
    a data storage device storing instructions for medical measurement reconstruction; and
    a processor configured to execute the instructions to perform operations comprising:
    receiving an indication of a downstream task from a reviewer;

obtaining a first reconstruction of at least one representation of at least one set of medical measurements;
determining, based upon the first reconstruction and the downstream task, a first quality score;
presenting the first quality score and the downstream task to the reviewer;
receiving a correction request from the reviewer;
processing the correction request;
generating a modified reconstruction based on the correction request;
determining, based on the modified reconstruction and the downstream task, a second quality score; and
iterating one or more steps of the instructions until the second quality score exceeds a predetermined threshold.

12. The system of claim 11, wherein the at least one set of medical measurements includes medical imaging measurements.

13. The system of claim 11, wherein the correction request relates to a characteristic of a patient.

14. The system of claim 13, wherein the characteristic includes an aspect of an anatomy or a physiology of a patient.

15. The system of claim 1, wherein processing the correction request includes reacquiring the at least one set of medical measurements to update the first quality score.

16. The system of claim 11, wherein processing the correction request includes estimating the at least one set of medical measurements to update the first quality score.

17. A non-transitory computer-readable medium storing instructions that, when executed by one or more processors, cause the one or more processors to perform computer-implemented method for medical measurement reconstruction, the method comprising:

receiving an indication of a downstream task from a reviewer;
obtaining a first reconstruction of at least one representation of at least one set of medical measurements;
determining, based upon the first reconstruction and the downstream task, a first quality score;
presenting the first quality score and the downstream task to the reviewer;
receiving a correction request from the reviewer;
processing the correction request;
generating a second, modified reconstruction based on the correction request;
determining, based on the modified reconstruction and the downstream task, a second quality score; and
iterating one or more steps of the method until the second quality score exceeds a predetermined threshold.

18. The non-transitory computer-readable medium of claim 17, wherein the at least one set of medical measurements includes medical imaging measurements.

19. The non-transitory computer-readable medium of claim 17, wherein the correction request relates to a characteristic of a patient.

20. The non-transitory computer-readable medium of claim 19, wherein the characteristic includes an aspect of an anatomy or a physiology of a patient.

21. The non-transitory computer-readable medium of claim 17, wherein processing the correction request includes reacquiring the at least one set of medical measurements to update the first quality score.

22. The non-transitory computer-readable medium of claim 17, wherein processing the correction request includes estimating the at least one set of medical measurements to update the first quality score.

* * * * *